United States Patent
Mayer

(10) Patent No.: US 8,191,593 B2
(45) Date of Patent: Jun. 5, 2012

(54) NON-SLIPPING WHEEL

(75) Inventor: Heinrich-Tito Mayer, Eschlihon (CH)

(73) Assignee: Diversey, Inc., Sturtevant, WI (US)

( * ) Notice: Subject to any disclaimer, the term of this patent is extended or adjusted under 35 U.S.C. 154(b) by 972 days.

(21) Appl. No.: 11/914,185

(22) PCT Filed: May 12, 2006

(86) PCT No.: PCT/US2006/018492
§ 371 (c)(1),
(2), (4) Date: Jul. 9, 2008

(87) PCT Pub. No.: WO2006/124632
PCT Pub. Date: Nov. 23, 2006

(65) Prior Publication Data
US 2009/0211676 A1 Aug. 27, 2009

(30) Foreign Application Priority Data
May 13, 2005 (EP) .................................. 05010501

(51) Int. Cl.
*B60C 7/00* (2006.01)
(52) U.S. Cl. .................................. 152/323; 152/209.15
(58) Field of Classification Search ............... 152/209.15
See application file for complete search history.

(56) References Cited

U.S. PATENT DOCUMENTS

| | | |
|---|---|---|
| 1,330,128 A | 2/1920 | Long |
| 5,147,477 A | 9/1992 | Mouri et al. |
| 5,376,700 A | 12/1994 | Yamazaki et al. |
| 5,520,232 A * | 5/1996 | Fukutake et al. ............. 152/267 |
| 2005/0199327 A1* | 9/2005 | Maeda .......................... 152/323 |

FOREIGN PATENT DOCUMENTS

| | | |
|---|---|---|
| DE | 231329 | 2/1911 |
| DE | 464198 | 8/1928 |
| DE | 641896 | 2/1937 |
| DE | 1004505 | 3/1957 |
| DE | 2502166 | 7/1976 |
| DE | 4206133 | 11/1993 |
| DE | 19952878 | 5/2001 |
| FR | 2828834 | 2/2003 |

(Continued)

OTHER PUBLICATIONS

Japanese Notification of Reason for Rejection—Dispatch Date: Jan. 19, 2011.

(Continued)

*Primary Examiner* — Khanh P Nguyen
*Assistant Examiner* — Vishal I Patel
(74) *Attorney, Agent, or Firm* — Gregory S. Bollis

(57) ABSTRACT

Non-slipping wheel (1) comprising an elastomer layer (3) which covers at least the radially outer part of the wheel, characterized in that the elastomer layer has been provided with bubbles which are continuously torn open during use of the wheel thereby generating a suction effect. The bubbles can be provided by foaming the elastomer. The elastomer can be polyurethane, and the wheel can further comprise an inner core layer (2) of a different material which is elastic, e.g., rubber. The wheel is particularly useful for floor cleaning machines: due to their use on ground which is covered by a cleaning solution, the wheels face traction problems—on the other hand, the wheels should not leave additional residues or markings on the floor.

20 Claims, 5 Drawing Sheets

FOREIGN PATENT DOCUMENTS

| | | |
|---|---|---|
| GB | 1060467 | 3/1967 |
| GB | 2183565 | 6/1987 |
| GB | 2283710 | 5/1995 |
| JP | 04176708 | 6/1992 |
| JP | 04238702 | 8/1992 |
| JP | 7-32814 | 2/1995 |
| JP | 7-28703 | 5/1995 |
| JP | 7-30103 | 6/1995 |
| JP | 7-31409 | 6/1995 |
| JP | 08309878 | 11/1996 |
| WO | 00/67976 | 11/2000 |

OTHER PUBLICATIONS

International Search Report prepared by the European Patent Office.

\* cited by examiner

NON-SLIPPING WHEEL

TECHNICAL FIELD

The present invention relates to a non-slipping wheel according to the preamble of claim 1. Particularly, the present invention refers to a non-slipping wheel for a floor cleaning machine.

BACKGROUND AND STATE OF THE ART

Various ways of reducing the slip of wheels are known in the art. Especially when a wheel driven vehicle is moved on slippery grounds measures have to be taken in order to ensure sufficient driving stability and, thus, safety. In particular, drive wheels of floor cleaning machines—if located behind the scrubbing unit of the machine—face severe traction problems: cleaning agents solved in the cleaning solution create a slippery area which can more or less be compared to an icy surface. Generally, the measures to reduce wheel slip consist in increasing the wheel traction by providing a tread profile which supports better friction. Several approaches to attack this problem are known wherein the tread profile can have various forms.

One possible approach consists in providing small separate recesses hollows in the outer surface of a conventional wheel in order to create a suction effect when such a recess or hollow contacts the ground. This approach has been known for quite some time, and DE 464 198, DE 641 896, DE 1 004 505, DE 2 313 29, and DE 42 06 133 are early and recent examples thereof. DE 199 52 878 aims at improving this suction effect by providing small channels inside the wheel connecting the hollows at the outer surface thereof with a device for creating a vacuum. However, the wheels according to these documents have the common drawback that the recesses or hollows are located at the outer surface of the wheel only (like a regular tread profile) and thus vanish over time due to abrasion. Consequently, as is the case with any conventional tread profile, the wheels become slick with reduced depth of the recesses.

Another approach consists in mixing particles to the wheel material during the manufacturing process wherein the particles drop out of the wheel material when they reach the outer surface of the wheel. WO 00/67976 discloses such a method of dosage and mixing of solid particles to non-vulcanized rubber or other polymeric materials using a stud extruder. This method particularly applies to the addition of abrasive particles to rubber for the production of friction tyres or antiskid soles for shoes. However, this method has the drawback that the solid particles which have been mixed to the wheel material continuously drop out during use of the wheels, thus leaving residues on the ground. Furthermore, a certain grinding effect is generated due to the solid particles which have not yet dropped out and which still project from the wheel surface. Whereas the residues and the grinding effect do not pose any problems for outdoor use, e.g., of a conventional car, they are counterproductive when the purpose of the wheel driven vehicle consists in cleaning the floor on which it runs.

Apart from the fact that the wheels of floor cleaning machines should not produce additional residues on the floor, care must also be taken that the wheels are non-marking—for example, a black wheel with coal as a filler is not feasible. Thus, one approach is based on rubber wheels with chalk as a filler (grey wheels). However, these wheels only deliver traction for a short period of time. Another solution is based on a special rubber (Vulkollan). However, like in the former case, the traction decreases over time, and in addition to that, the manufacturing process is complicated and the base material is expensive. Still another approach consists in using polyurethane as the wheel material. However, this material is also very expensive and has the additional drawback that it is very rigid which in turn makes even smallest unevenesses noticeable. Thus, a modified approach consists in providing wheels with a rubber core and an outer surface made of polyurethane which results in better damping at even lower costs. However, using polyurethane—even with a conventional tread profile—for the wheel still does not lead to proper traction when it runs on a ground which is covered with a cleaning solution.

SUMMARY OF THE INVENTION

It is thus an object of the present invention to provide a wheel which overcomes the above mentioned drawbacks—in particular when applied to (indoor) floor cleaning purposes. It shows better traction which does not vanish with abrasion of the outmost surface during use.

This is achieved by a non-slipping wheel with the features as described in claim 1. According to the present invention, the non-slipping wheel comprises an elastomer layer which covers at least the radially outer part of the wheel, characterized in that the elastomer layer has been provided with bubbles which are continuously torn open during use of the wheel thereby generating a suction effect and enhancing the roughness of the outer surface of the wheel.

The non-slipping wheel is manufactured by a method according to claim 10. According to the present invention, the method comprises the steps of: providing an elastomer and creating bubbles therein; applying a radial inner wheel core to a rim and grinding or polishing the radial outer surface of the inner core in order to obtain a surface appropriate for gluing or vulcanizing; gluing the radial outer surface of the core together with the foamed elastomer or vulcanizing the latter thereto such that a radial outer elastomer layer containing the bubbles is formed which are continuously torn open during use of the wheel thereby generating a suction effect and enhancing the roughness of the outer surface of the wheel.

In a preferred embodiment, the non-slipping wheel comprises an outer layer of foamed polyurethane and, in addition to that, an inner rubber core.

DESCRIPTION OF THE PREFERRED EMBODIMENTS

Figure 1:
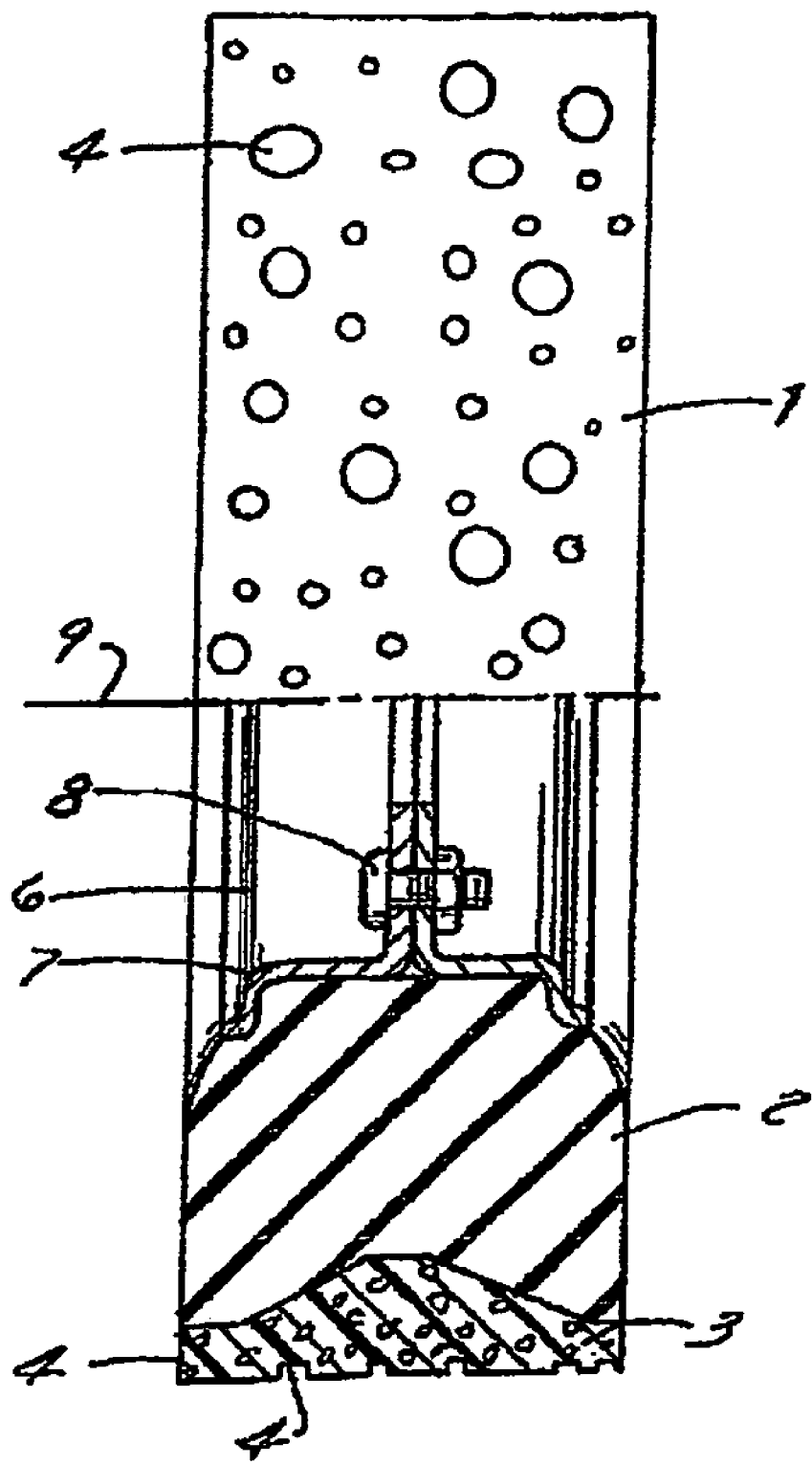
FIG. 1 shows the non-slipping wheel according to a first embodiment of the present invention wherein the upper half is a plan view on the radial outer surface of the wheel and the lower part is a section through the wheel.
Figure 2:
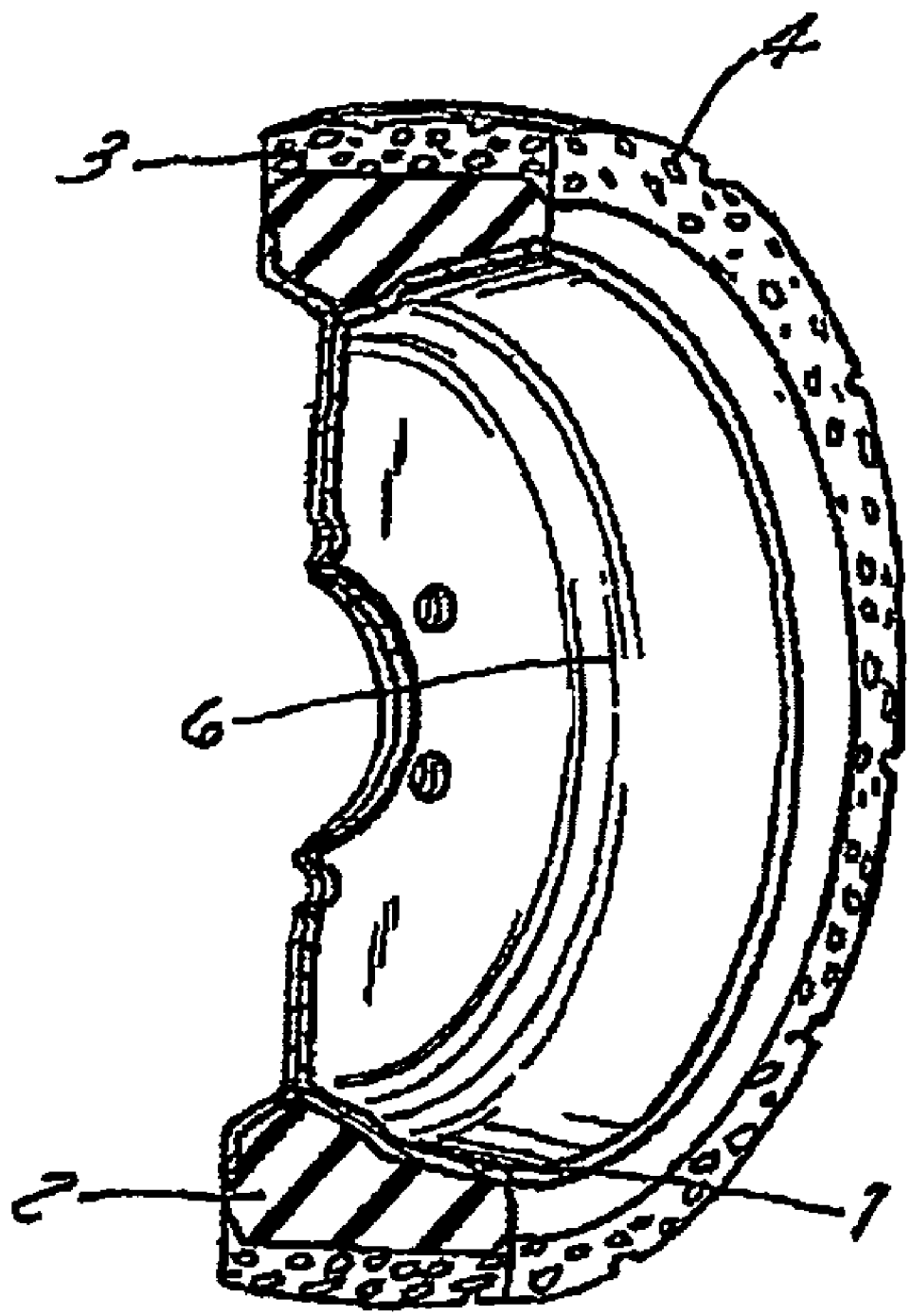
FIG. 2 shows an oblique section of the wheel of FIG. 1.

FIGS. 1 and 2 illustrate a non-slipping wheel 1 which comprises a radial inner core 2, e.g., a rubber core, to which a radial outer elastomer layer 3 containing bubbles 4 is applied—for example, the outer elastomer layer can be a polyurethane layer. The inner core is applied to the jacket 7 of a rim 6 which is known per se and which comprises means 8 for attaching it to an axis 9.

The manufacturing process of such a wheel is as follows. The elastomer is foamed such that it contains bubbles 4 which are distributed over its entire volume. This foaming can be performed in a process known per se. The inner core 2 is applied to the rim 6 and the radial outer surface of the inner core is grinded or polished in order to obtain an appropriate surface for gluing it together with the elastomer—or for vulcanizing the latter thereto—such that a radial outer elastomer layer 3 containing the bubbles 4 is formed. The radial outer surface of the inner core 2 can be recessed towards it center—for example, it can have a triangular section as shown in FIG. 1—in order to achieve additional protection against lateral displacement of the elastomer layer 3 relative to the inner core 2. However, the radial outer surface of the inner core can also have various other forms, for example it can be essentially flat as shown in FIG. 2. It should be noted that other materials than rubber and polyurethane can also be used—for example, another elastomer could serve same purpose as long as it is provided with the bubbles 4. Furthermore, the bubbles inside the elastomer can be created in a different way as long as the bubbles 4 appear over an essential part of the radial extension of the outer elastomer layer 3—for example, the bubbles can be created by introducing micro balloons or capsules containing air (known from polymer processing) into the elastomer material. According to the invention, the bubbles 4 appear over the whole or at least an essential part of the radial extension of the elastomer layer 3; i.e., they appear at the radially outer surface of the wheel 1 as well as radially inwards up to the radially inner surface of the elastomer layer 3 adjacent the inner core 2.

Figure 3A:
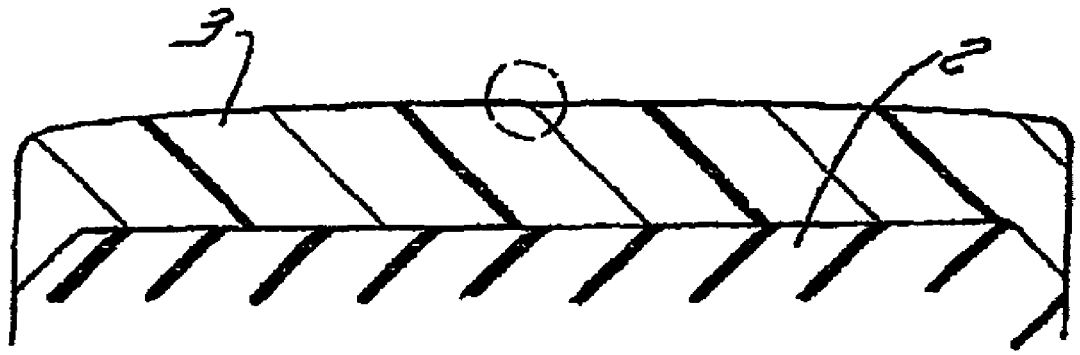
FIG. 3A shows a section of radial outer part of the wheel of FIGS. 1 and 2.
Figure 3B:
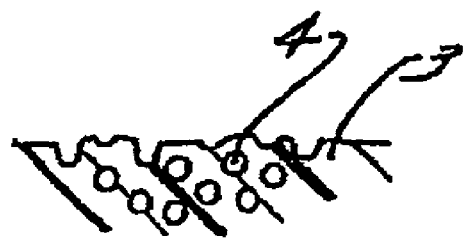
FIG. 3B shows an enlarged view of the area indicated by the circle in FIG. 3A.

FIGS. 3A and 3B show the bubbles 4 in more detail. Due to abrasion during use of the wheel 1, the elastomer layer 3 is continuously removed radially inwards over time. As can be obtained from FIG. 3B, whenever the remaining radially outer elastomer layer enclosing a bubble 4 has become thin enough, it is torn open when contacting the ground and the bubble 4 is opened and then generates a suction effect. On the other hand, the rough outer surface of the wheel—which is generated due to the opened bubbles—generally generates a better grip on the ground. Since the bubbles 4 are distributed over the whole or at least an essential part of the radial range of the outer elastomer layer 3, wear and tear continuously leads to the opening of new bubbles 4. Thus, traction of the wheel 1 is maintained over the whole life time of the outer elastomer layer 3 if the bubbles are provided over its whole radial extension.

In this way, the problems mentioned above are overcome. On the one hand, the bubbles 4 are located not only at the outer surface of the wheel but over the whole or at least an essential part of radial extension of the elastomer layer 3. Thus, the suction effect (producing sufficient traction) does not vanish with the outer surface as is the case with the state of the art wheels which contain recesses or hollows at their outer surface only (like conventional tread profiles). On the other hand, the wheels according to the present invention do not contain any particles which have been mixed to the wheel material during manufacturing and which continuously drop out during use of the wheels, thus leaving residues on the ground. As mentioned above, this is counterproductive if the purpose of the wheel driven vehicle consists in cleaning the floor on which it runs.

The radial extension of the inner rubber core 2 and the outer polyurethane layer 3—i.e., the quantitative relation between these layers—can vary depending on the application. If life time is not as crucial as a certain elasticity of the wheel 1, the inner rubber core can cover the major part of the wheel. As mentioned above, polyurethane is a very rigid material which makes even smallest unevenesses noticeable. On the other hand, if elasticity is not as important as a long life time of the wheel—in particular, a long life time of the bubbles which create the suction effect—, the polyurethane layer 3 can cover the major part of the wheel. In fact, the inner rubber core 2 can be omitted completely and the elastomer layer 3 can be applied to the rim 6 directly.

Figure 4:
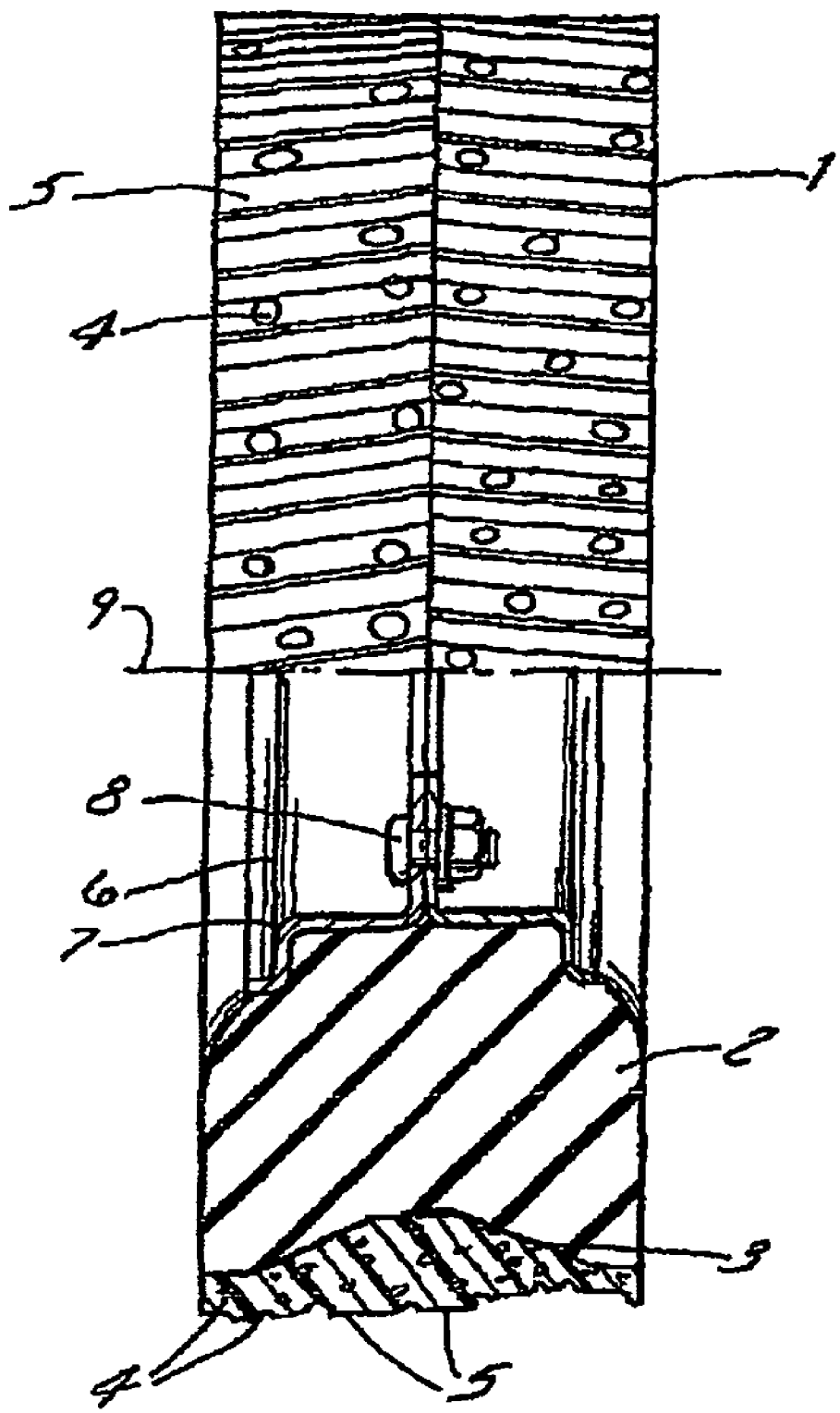
FIG. 4 shows a view similar to the one in FIG. 1 of the non-slipping wheel according to a second embodiment of the present invention.
Figure 5:
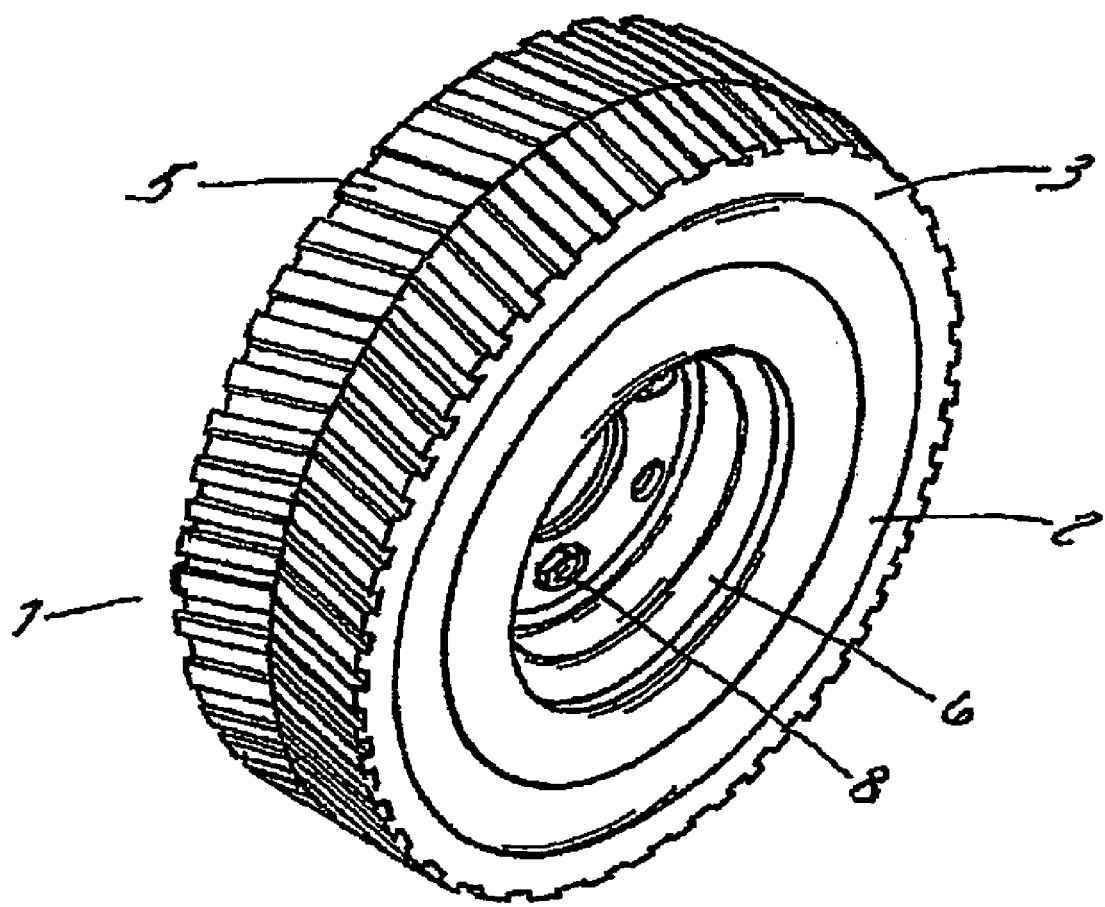
FIG. 5 shows an oblique view of the wheel of FIG. 4.

FIGS. 4 and 5 show another embodiment of the present invention, wherein the wheel 1 is also be provided with a conventional tread profile 5 in addition to the bubbles 4. With such a profile, a lower water displacement is achieved—accordingly, the cleaning solution will also be displaced at a lower rate and can take effect for a longer time.

It is emphasized that the preferred embodiments of the non-slipping wheel, in particular for a floor cleaning machine, as mentioned above describe the invention by way of example only. Various alternatives are also in the scope of the present invention as defined in the appended claims. For example, other elastomers than polyurethane can be used as well as other core materials than rubber. Furthermore, the core itself can be foamed in order to reduce weight and to set the degree of hardness.

The invention claimed is:

1. Non-slipping wheel comprising an elastomer layer which covers at least the radially outer part of the wheel, characterized in that the elastomer layer has continuously torn open bubbles thereby generating a suction effect and enhancing the roughness of the outer surface of the wheel.

2. Non-slipping wheel according to claim 1, wherein the elastomer provided with bubbles is a foamed elastomer.

3. Non-slipping wheel according to claim 1, wherein the elastomer is polyurethane.

4. Non-slipping wheel according to claim 1, wherein the wheel further comprises an inner core of a different material.

5. Non-slipping wheel according to claim 4, wherein the radial outer surface of the inner core is recessed towards its center.

6. Non-slipping wheel according to claim 4, wherein the inner core material is foamed.

7. Non-slipping wheel according to claim 4, wherein the inner core material is elastic.

8. Non-slipping wheel according to claim 7, wherein the inner core material is rubber.

9. Non-slipping wheel according to claim 1, wherein the wheel further comprises a tread profile.

10. Combination of a non-slipping wheel according to claim 1 and a floor cleaning machine.

11. The non-slipping wheel according to claim 1, wherein the bubbles include micro balloons containing air, and wherein the micro balloons are positioned throughout the radial depth of the elastomer layer such that wear of the wheel continuously opens some of the micro balloons.

12. A non-slipping wheel having a radius and comprising an elastomer layer which covers at least a radially outer part of the wheel, characterized in that the elastomer layer has bubbles positioned to tear open at different radial levels of wheel wear thereby generating a suction effect and enhancing the roughness of the outer surface of the wheel.

13. The non-slipping wheel according to claim 12, further comprising an inner core of a material different from the elastomer layer.

14. The non-slipping wheel according to claim 12, further comprising a tread profile disposed on the radially outer part of the elastomer layer.

15. The non-slipping wheel according to claim 12, wherein the elastomer layer includes polyurethane.

16. A non-slipping wheel comprising an elastomer layer which covers at least the radially outer part of the wheel, characterized in that the elastomer layer has a plurality of micro balloons containing air positioned adjacent the radially outer part of the wheel and radially inward toward a radially inner part of the elastomer layer such that wear of the wheel continuously opens some of the micro balloons thereby generating a suction effect and enhancing the roughness of the outer surface of the wheel.

17. The non-slipping wheel according to claim 16, further comprising a tread profile disposed on the radially outer part of the wheel elastomer layer.

18. The non-slipping wheel according to claim 16, further comprising an inner core of a material different from the elastomer layer.

19. The non-slipping wheel according to claim 18, wherein the radial outer surface of the inner core is recessed towards its center.

20. The non-slipping wheel according to claim 18, wherein the inner core material is foamed.

* * * * *